Figure 1:
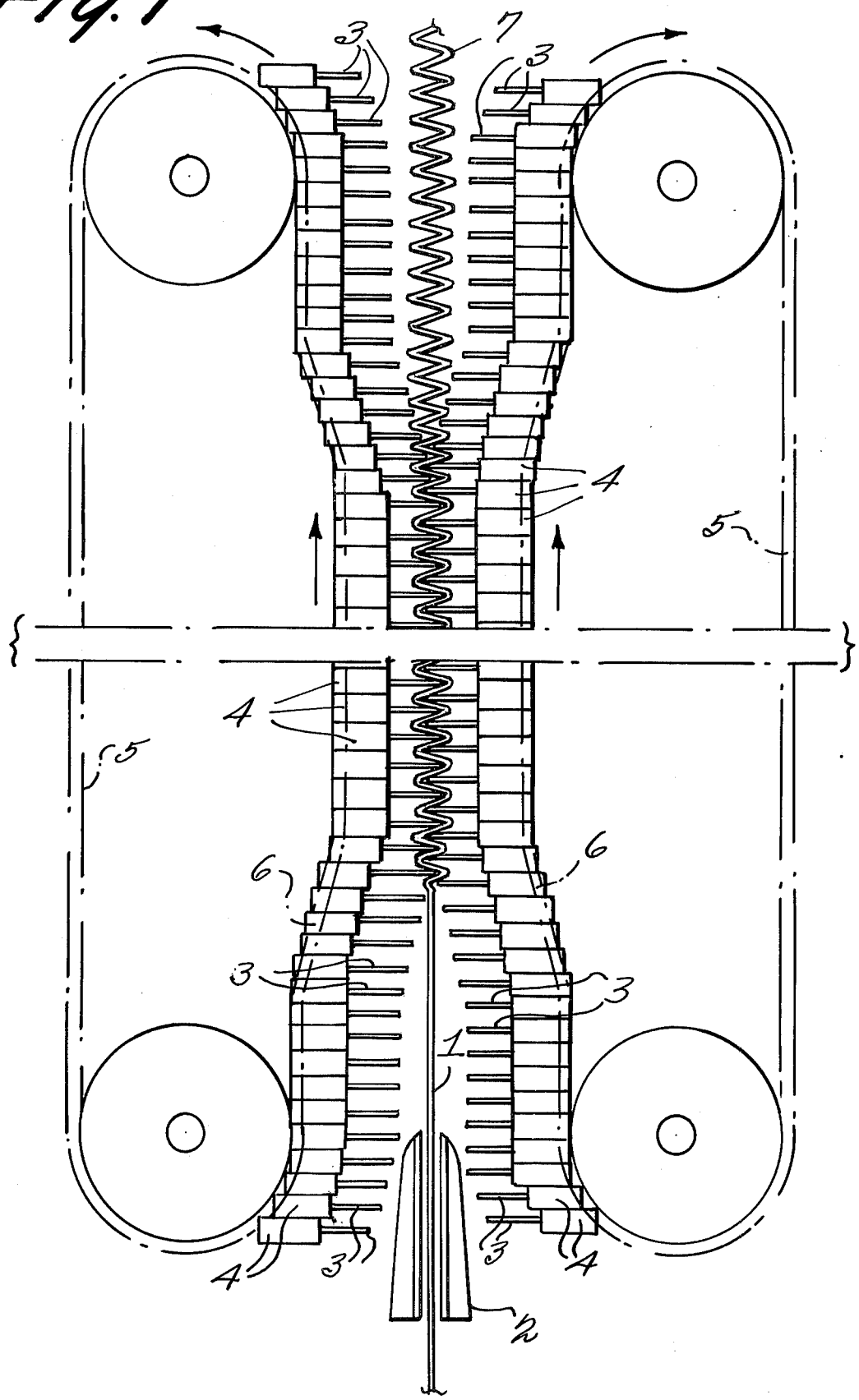

United States Patent [19]

Keith

[11] 4,025,599
[45] May 24, 1977

[54] CUSPATED SHEET FORMING

[75] Inventor: Donald George Keith, Mount Eliza, Australia

[73] Assignee: ICI Australia Limited, Australia

[22] Filed: Apr. 20, 1976

[21] Appl. No.: 678,713

Related U.S. Application Data

[63] Continuation of Ser. No. 482,982, June 25, 1974, abandoned, which is a continuation-in-part of Ser. No. 307,211, Nov. 16, 1972, abandoned.

[30] Foreign Application Priority Data

| Nov. 29, 1971 | Australia | 7210/71 |
| Mar. 8, 1972 | Australia | 8206/72 |
| Apr. 13, 1972 | Australia | 8598/72 |
| June 29, 1972 | Australia | 9523/72 |

[52] U.S. Cl. ............... 264/167; 72/342; 164/87; 264/165; 264/210 R; 264/285; 264/288

[51] Int. Cl.² ............ B29B 3/02; B29C 17/03

[58] Field of Search ......... 264/165, 167, 285, 286, 264/288, 210; 164/87; 72/342

[56] References Cited

UNITED STATES PATENTS

| 2,582,294 | 1/1952 | Stober | 264/210 X |
| 3,067,806 | 12/1962 | Trelease | 156/591 |
| 3,169,274 | 2/1965 | Colombo | 264/286 X |
| 3,220,544 | 11/1965 | Lovell | 264/292 X |
| 3,724,673 | 4/1973 | Ryon | 264/92 X |
| 3,864,446 | 2/1975 | Maroschak | 264/286 X |
| 3,879,508 | 4/1975 | Gilbert | 264/286 X |
| 3,902,348 | 9/1975 | Hale | 72/342 |

Primary Examiner—Richard R. Kucia
Attorney, Agent, or Firm—Cushman, Darby & Cushman

[57] ABSTRACT

A continuous process of forming a sheet of thermoplastic material by sequentially pressing against one face of the hot sheet of material the cold tips of projections set in and extending normally from a first series of separately moveable combs and sequentially pressing against the second face of the material the cold tips of projections set in and extending normally from a second series of separately moveable combs so that the projections of the first series of combs interpenetrate with the projections of the second series of combs in such a manner that the projections of the first series are spaced from the projections of the second series by a distance greater than the thickness of the sheet; and the interpenetrated projections are substantially parallel during the act of interpenetration; and wherein the interpenetrated combs are moved along at the speed of the sheet until the sheet is set and the combs are then removed and recycled.

5 Claims, 5 Drawing Figures

U.S. Patent May 24, 1977 Sheet 1 of 2 4,025,599

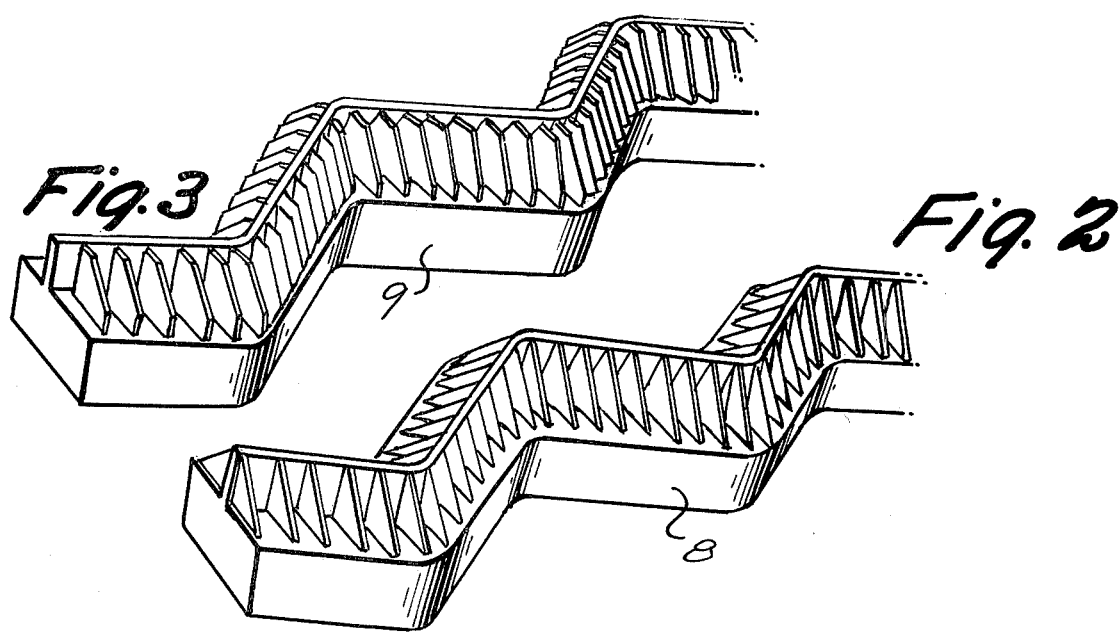
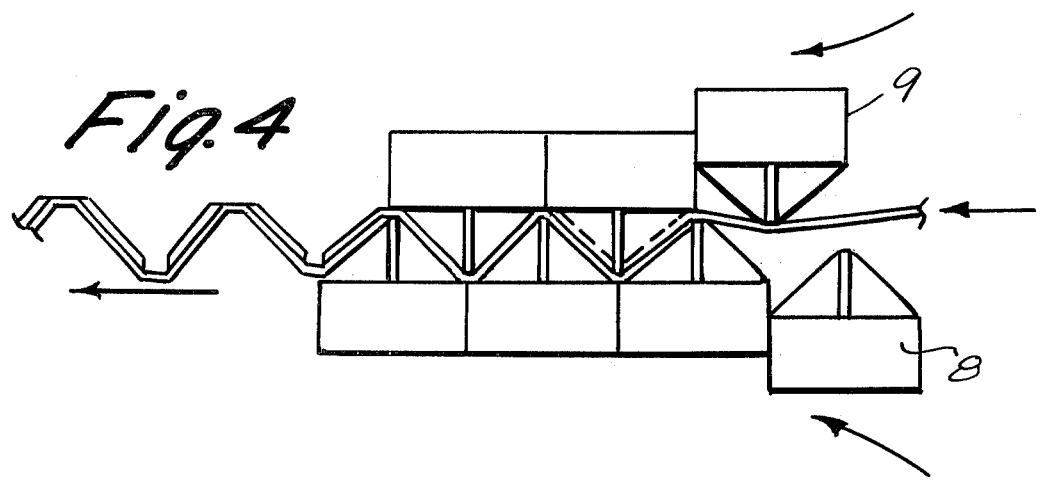
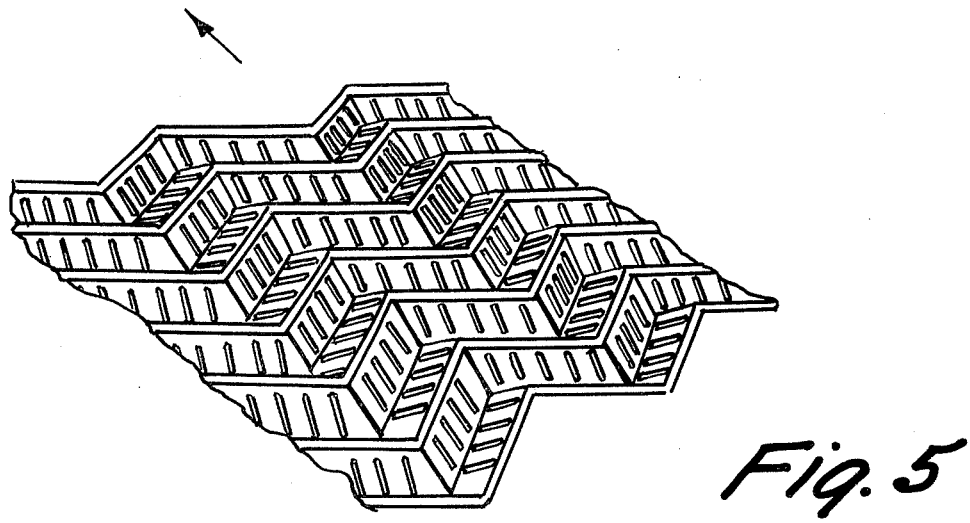

CUSPATED SHEET FORMING

This is a continuation of application Ser. No. 482,982, filed June 25, 1974 as a continuation-in-part of application Ser. No. 307,211, filed Nov. 16, 1972 both now abandoned.

This invention relates to shaped products and to a process of forming shaped products; in particular it relates to a process and apparatus for forming thermoplastic materials and to the shaped products obtained by the process.

We have now found a continuous process of deep drawing thermoplastics to give a formed sheet of varying cross section.

Accordingly we provide a continuous process of forming a sheet of thermoplastic material by sequentially pressing against one face of the hot sheet of material the cold tips of projection set in and extending normally form a first series of separately moveable combs and sequentially pressing against the second face of the material the cold tips of projections set in and extending normally from a second series of separately moveable combs so that the projections of the first series of combs interpenetrate with the projections of the second series of combs in such a manner that the projections of the first series are spaced from the projections of the second series by a distance greater than the thickness of the sheet; and interpenetrated projections are substantially parallel during the act of interpenetration; and wherein the interpenetrated combs are moved along at the speed of the sheet until the sheet is set and the combs are then removed and recycled.

We also provide an apparatus for carrying out the continuous process of our invention.

The projections of the combs may be arrays of projections having relatively large blunt tips which contact substantial areas of the plastic sheet. Such projections may be formed from blunt pins of various cross sections or from bars or strips or other shapes.

The use of blunt ended projections although satisfactory has the disadvantage that the thermoplastic sheet is not drawn efficiently as the material in contact with the cold ends of the projections remains substantially unworked.

We therefore prefer that the area touched by the projections is a minor proportion of the whole area and thus we prefer that the projections consist of a series of pointed pins or knife edges.

In this case parts applying thrust may be arrays of needle points regularly spaced as in the net of intersections of a lattice, or rows of closely positioned needle points so adjacent as to form dotted lines, or at the limit sharp knife edges as continuous lines of infinitesimal area, these patterns being not restricted to linear or coplanar designs, but include knife edges on at least one mould array which may be circular, polygonal or take the form of any other re-entrant curves, the upper and lower patterns being so positioned that all parts of the upper pattern may inter-digitate with the lower pattern, so that when the patterns are at controlled rate allowed to contact a sheet plastic at thermoforming temperature small areas of solid plastic will form on the cold conductive needle points or knife edges. These chilled elements of the plastic conforming closely to the tapered needle tip or knife edge will allow enough thrust to be transmitted as interdigitation proceeds to stretch still molten sheet areas untouched by any projections. These effects securing that since a smaller part of the plastic mass than in any prior art becomes frozen in the original state more material is available for deep draw than has hitherto been possible. As "bulking" a flat sheet means creating frequent and abrupt reversals of slope our process offers unique efficiency while offering the possibility of symmetrical thickness change on either side of the neutral axis. The process being operated continuously by the recirculation of the combs containing groups of sharp pins, knife edges, groups of knife edge designs on modular blocks and mixtures of needle and blade components, these recirculative elements being continuously brought into a desired pattern register and caused to interdigitate, at controlled rate by camming so that the thermoformable plastic sheet trapped between the mold arrays is progressively drawn, held in position until cool and released by withdrawal and recirculation of the modular combs.

By hot we mean at a temperature sufficient to allow the thermoplastic material to thermoformed preferably at a temperature higher than the melting point of the thermosplastic material, most preferably the thermoplastic material forms a melt of a fluid nature at the thermoforming temperature. By cold we mean at a temperature insufficient to allow facile thermoforming preferably at a temperature lower than the melting or softening point of the thermoplastic material. The sheet will not normally be drawn to any appreciable extent where it contacts the surface of a cold projection. Indeed wherever a cold projection makes contact with the hot sheet a chilled slug of material will form, and the greater the cooling capacity of the projection the greater the mass and area of the chilled slug will be. However we may optionally control or reduce the size of the chilled slug by reducing the cooling capacity of the projection by all or some of these expedients: first, by using projections of small volume and very low subtended area such as sharp slender needles or blades, second by using projections of lower specific heat and/or thermal conductivity, third by limiting the coldness of the projections.

The materials which perform most aptly in our process are substances which while at working temperature are easily extensible under very low forces, but which are strong tenacious materials at a somewhat lower temperature.

The nature of the product obtained in our process depends upon the nature of the thermoplastic material and the temperature and speed at which the interdigitation of the two arrays is carried out. In general thermoplastic materials which may be melt spun will, if formed in the process of our invention at a temperature in the range required for satisfactory melt spinning, produce a deep drawn unperforated cuspated sheet, except that a perforated cuspated sheet will be produced if the speed at which the interdigitation is carried out is so fast that the material cannot stretch sufficiently fast to relieve build up of tension on the points of the arrays of projections.

Materials having poor melt spinning characteristics also behave poorly as a feed material for the process of our invention. Thus, for example, plasticised polyvinyl chloride may be formed by our process but the product will contain many perforations unless the process is carried out reasonably slowly or the polyvinyl chloride heated to a temperature just below its decomposition point or the projections are relatively blunt. Thus materials having good melt spin properties may be highly deep drawn by our process at high speed but materials having poor melt spin properties may only be deep drawn to a very limited extent and the speed of the process is relatively low. For any particular thermoplastic material the most suitable temperature and speed at which the process of our invention should be carried out must be found by simple experiment.

The preferred thermoplastic materials having good melt spin properties are well known in the art and include, for example, vinyl polymers such as certain polyvinylidene chloride copolymers and certain copolymers of ethylene and vinyl alcohol; polyolefins such as low density polythene, high density polythene, polypropylene, high impact polystyrene and poly (4-methylpentene-1); polyesters such as poly (ethyleneterephthalate) and poly[1, (1-bis(methylene)-cyclohexaneterephthalate (1′2-cis:trans)]; polyamides such as nylon 66, 610, 6 and 11; inorganic glass such as soda or borosilicate glass; low melting point metal alloys such as the so called superplastic zinc or aluminium sheet; supercooled liquid sugar solution such as toffee; and thermoplastic rubbers.

So that our invention may be more clearly understood a preferred embodiment will now be discribed with reference to FIG. 1.

FIG. 1 shows a schematic view of an apparatus for continuous operation of our process. Thermoplastic film 1 is extruded from the extruder die 2 and fed between the arrays of needles. The individual rows of needles 3 are mounted on combs 4 which are separately slideable in a direction at right angles to the plane of two cooperative belts or link-chain circuits 5 and the interdigitation of the combs is effected by camming 6 as is the withdrawal of the combs after the formed sheet 7 has cooled.

In this preferred embodiment the sheet of thermoplastic material is molten during the act of interpenetration and the projections on at least one of the series of combs are pointed pins.

The nature of the projections in the second series of projections is not critical as long as the projections in the two series of combs may interpenetrate as described hereinbefore. Preferably the projections on the second series of combs is also an array of pointed pins.

Most preferably the array of pins in each series are arranged as a regular lattice with the points of one series interpenetrating into the centre of the lattice of the other series. This arrangement results in the manufacture of a cuspated sheet having pointed cusps extending outwardly from each side of the median plane.

In a second preferred embodiment the second series of projections is in the form of a grid or honeycomb; most preferably regular and having sharp edges into the centre of the appertures of which the pins of the first series interpenetrate. This arrangement results in the manufacture of a cuspated sheed having pointed cusps extending from one side only of the sheet.

In these embodiments of our invention using pointed pins the thermoplastic sheet is preferably a melt spinnable thermoplastic material.

An essential principle of our process in this preferred embodiment is that whereas a cold sharp needle will readily puncture a tensioned elastic membrane, or at least cause extreme thinning at the point of contact, such a cold needle or knife edge will, however sharp, not puncture a membrane of fluid melt, but will push the melt membrane ahead of its point, causing a typical cusp shaped 'draw'.

A further preferred embodiment of our invention relates to a process of deforming thermoplastic sheet in particular this invention relates to a method of forming bi-corrugated sheets.

Bi-corrugated thermoplastic sheets are normally made by vacuum, drape or blow forming in a batch process.

In processes of press stretching or stretching by differential fluid pressure (vacuum, drape, blow forming) a flat sheet is given increased area (therefore stretched) by making it concave. Such increase of area is achieved by generating concavity predominantly above or below the original sheet plane which causes powerful resultant tensions both along and across the original sheet plane, and the sheet can only be operated on if its original boundaries are constrained unchanged by powerful clamping means. The material under the clamping ring is usually waste, up to 25% of the product area, and a trimming operation is required.

We have now discovered a process of forming thermoplastic continuously in which the thermoplastic sheet does not require clamp and hence the product may be used without trimming.

Accordingly in a preferred embodiment of our invention we provide a continuous process of deforming a sheet of thermoplastic material by sequentially pressing against one face of the hot sheet of material the cold tips of projections set in and extending normally from a first series of separately moveable combs and sequentially pressing against the second face of the material the cold tips of projections set in and extending normally from a second series of separately moveable combs so that the projections on the first series of combs interpenetrate with the projections on the second series of combs in such a manner that the projections of the first series are spaced from the projections of the second series by a distance greater than the thickness of the sheet; the interpenetrated projections are substantially parallel during the act of interpenetration; and the combs of any one series form a block pressing against the sheet of thermoplastic material, wherein the block so formed by the combs of any one series has two straight parallel sides, parallel with the sides of the thermoplastic sheet and has non-linear projections running across the block having a median normal to the parallel sides of the block said projections characterised in that an envelope around any one projection overlaps with the envelope around an adjacent projection; the combs each contain one or more complete projections; and wherein the interpenetrated combs are moved along at the speed of the sheet until the sheet is set and the combs are then removed and recycled.

We also provide an apparatus for use in the process of our invention.

In this preferred aspect of our invention the shape of the projections on each block is not narrowly critical as long as the projections are non-linear in the plane of the block and as long as the projections cannot be separated one from another by means of a straight line not passing through a projection. Typical projections used in our invention are sine shaped curves or zigzags but other more complicated non-linear shapes are not excluded. The projections may be either sharp ended or blunt ended and may extend continuously across the width of the comb or may extend only partially across the comb. The projections may also optionally have side portions extending from the main projections. All parts of the projections need not be set the same height above the comb surface but the height may be varied so as to give fine structure to the product. The projections on one series of combs may be of different shape to the projections on the second series of combs.

Suitable projections are, for example, knife blades set sharp end outwards from the comb or may be strips or bars of material conveniently metal optionally fitted to a suitable support and thence fitted into the comb.

The depth of draw is not critical and may range from shallow to extremely deep drawn articles in which the distance between adjacent projections is less than half the height of the projections.

For the manufacture of deep drawn sheet we prefer that the thermoplastic sheet is melt spinnable and that the projections are sharp ended.

For the manufacture of shallow drawn sheet the thermoplastic sheet need not be melt spinnable in which case the projections are preferably blunt ended for example, metal bars.

The crux of this preferred embodiment of our invention is the realization that a formed sheet may be formed continuously and without side clamp by a process in which the sheet is formed by interaction of projections in which the moving instant of interaction between the projections on the combs occurs at a standing front whose locus is a non-rectilinear line.

It is clear that in such a process the convexity/concavity is connective across the machine direction where single sinuous valleys pass entirely across the article. It would appear that as in vacuum forming the side to side stretch would require heavy clamping means to resist side tension.

We have found that such side tension either does not arise at all or in process terms is trivial and requires no clamp. Surprisingly, using zig zag projections the resultant tensions arising from each slanting part of the sinuous ridge are equal and opposite. Hence, the process works continuously and clamplessly and with a non-linear standing front.

In addition, it is by no means obvious that a thermoplastic sheet could be satisfactorily formed using combs in which the forming is carried out on a non-linear front as it would be expected that the forming by the first comb would effect the forming by the second comb.

So that the invention may be more clearly defined a preferred embodiment useful for the manufacture of 'Flocor' will now be described with reference to the diagrams in which FIG. 2 shows a perspective view of a comb of the first series of combs FIG. 3 shows a perspective view of a comb of the second series of combs FIG. 4 is a schematic view of the preferred apparatus of our invention FIG. 5 is a perspective view of the product formed using the apparatus.

The product (FIG. 5) formed in the preferred embodiment of our invention has hitherto only been prepared using accurately made dies in a conventional moulding process. Using the combs shown in FIG. 2 and 3 it is possible to mimic the moulded product using combs which do not have any inter-touching parts and therefore need not be made to the high degree of accuracy of the conventional process. Our continuous process has the additional advantage that there is no edge loss due to clamp.

The product is of use in effluent treatment as a packaging for effluent towers.

In FIG. 1 thermoplastic film 1 is extruded from the extruder die 2 and fed between two series of combs 4. The individual rows of projections 3 are mounted on combs 4 which are separately slideable in a direction at right angles to the plane of two cooperative belts or link-chain circuits 5 and the interdigitation of the combs is effected by camming 6 as is the withdrawal of the combs after the formed sheet 7 has cooled. Alternatively the combs after withdrawal may be returned to the head of the machine by means of a quick return mechanism. Suitable mechanisms will be obvious to those skilled in the art.

In the formation of highly shaped articles such as shown in FIG. 5 we prefer that the combs 4 are not identical in each series. FIG. 2 shows a comb 8 of the first series and FIG. 3 shows a comb 9 of the second series for making the sheet of FIG. 5. A more detailed description of the combs is given in Example 1 hereinbelow.

FIG. 4 depicts schematically the way in which the combs 8 of the first series are alternatively interdigitated with the combs 9 of the second series.

The combs and the projections on the combs may be made of any suitable material such as, for example, metal ceramic, glass, wood or certain rigid plastic materials. The suitability of any particular material depends upon the conditions required to form the plastic sheet being used as feed stock for our process.

In a further aspect of our invention the projections on the combs are strips or knife edges set across the combs to form a continuous projection across the series of combs in such a manner that the continuous sheet formed is corrugated or bicorrugated with the continuous corrugations running along the length of the sheet. This preferred process may be used to produce continuously corrugated thermoplastic roofing materials. Continous corrugated plastic have hitherto been only produced by extrusion through a specially shaped sheet die and it has not previously proved possible to produce continuously corrugated or other sheet of non-uniform cross section. The process of our invention has the capability of producing reinforced sheet with superior strength.

The invention will now be illustrated by, but by no means limited to, the following examples.

EXAMPLE 1

The combs (8, 9) were produced as follows. A strong steel strip was bent in zig zag or sinuous form and affixed edgewise to a strong wooden base. At frequent intervals fins or fillets of thin sheet metal were affixed so that each pair of fins formed a counter ridge running from the crest of the sinuous steel strip to the surface of the wooden base. The wooden base was machined to the form defined by the set of fillets. In each lower comb 8 the fillets were triangular, in each upper comb 9 the fillets were essentially triangular with an extension beyond the hypotenuse, these extensions being intended to interdigitate with the fillet edges of the opposite modules, drawing secondary corrugations in the valley wall of the shapings to enhance the stiffness.

EXAMPLE 2

Combs such as those described in Example 1 were mounted in two sets of combs in a travelling press comprising recirculating means 5 conveying the combs in such a way that during the active portion of the moulding cycle the upper and lower combs while being maintained in precise register and always parallel to the horizontal plane are slowly interdigitated, and interdigitation is maintained until the moulded sheet has cooled, then the combs are recirculated optionally by a quick return device. To this continuous machine plastic sheet at thermoforming temperature was supplied either by extrusion from a slit die (low density polythene) or by the reheating of sheet coilstock by controlled radiant heating (PVC copolymer).

We found that under carefully controlled conditions the continuously shaped sheet was obtained from hot precursor sheet of equal width and no trim or edge clamp was required.

EXAMPLE 3

The machine described in Example 2 was employed using various plastics. Rigid PVC copolymer sheet (12% vinyl acetate/vinyl chloride copolymer) was reheated in such a way that sheet entered the continuous machine at a temperature of 165° C, sheet input being at a linear speed of 14'/min. The closure or interdigitation of combs was cammed 6 to occur at a rate vertical to the machine plane of 2'/min. Excellent product with well distributed stretch, good hot stability and good compressive strength was obtained continuously. Both the 'hill' and 'valley' of the shaped material were identical in materials thickness, materials distribution, and strength and no clamp or edge trim was required. These shapings, continuously produced, were found to be 20% stronger in compression than similarly designed vacuum formed panels, and represented a great economy in materials, as the batch vacuum formed panels required a clamped area 25% of the useful area, that clamped part being lost as trim.

The same machine was installed before a screw extruder supplying a slit die, and used to continuously mould polyethylene of both low and high density types, polypropylene and high impact styrene resins. We found that except for slight alterations to input temperature and rate of machine closure excellent results were obtained with all these materials and in particular the materials distribution with polyolefines was excellent whereas these materials respond especially poorly to vacuum forming.

EXAMPLE 4

The machine described in Example 2 was fitted with combs 1 inch wide and running straight across the machine width at right angles to the continuous production direction. On each comb of both the upper and the lower recirculative sets sharp needles were placed so as to project 1 inch from the comb. These needles formed a square lattice pattern at 45° to the machine direction, the diagonal of the square being ⅓ inch and accordingly each comb contained six needle rows. In an extensive series of long runs several polyolefine plastics, including many grades, compounds and copolymers were extruded from a slit die, passed into the machine at temperatures from 25° C to 80° C above their hardening temperatures, and were drawn in a range of depths up to 0.600 inch, the thickness of plastics as extruded being in the range 0.010 to 0.100 inch and the rate of manufacture being in the range 3 to 22 ft/min in 24 inch width. Conditions were maintained by cooling means to ensure reasonable stability in input temperature of the needles. For low density polyethylene we found that input needle temperatures in the range 30° C to 50° C were well suited, while somewhat higher melting plastics such as polypropylene could tolerate needle temperatures to 85° C. We found further that needle temperature (rate of draw being constant) exerted steeply in effect on the amount of material frozen on cusp tips. The needles were of one sixteenth inch diameter, of mild steel and tapered to sharp points.

EXAMPLE 5

The product from the runs described in Example 4 was extensively studied. We found that maximum compression and shear strength was obtained (for a given apparent density) when the aspect ration of the cusps (depth of draw to diagonal of lattice square) was about 1.6 and at this optimum compressive and shear strengths were more than twice those of foam plastics of the same material at the same apparent density. These materials were pliable, bulky, visually richly textured and though greatly increased in surface area were still complete inperforate membranes. Lightweight forms fulfilled many protective packing and display uses, medium weights proved excellent as decorative sheet for light structural use, while heavier material was excellent for some forms of mats and floor coverings. We use the term light to refer to sheet from feedstock up to 0.020 inch thick, medium up to 0.040 inch thick, heavy 0.040 to 0.100 inch or more. No side clamp was required in the process and feedstock was patterned to the free edge, obviating any need for trim or secondary cutting.

EXAMPLE 6

The machine of Example 2 was fitted with 1 inch combs bearing straight lengths of sharpened steel knife edge at right angles to the machine direction and extending across machine width. This steel lnife edge was purchased as "steel rule" a strong sharp material available for making up by carton makers, being sharp and strong enough to stamp through heavy cardboard. Such strips 1 inch deep were placed at ½ inch spaces on each comb. As feedstock we employed plastics sheet purchased in the roll and supplied it via a reheat line which by means of radiant heaters warmed the plastics coilstock to forming temperatures as it approached the forming machine. We employed in various runs rigid polyvinyl chloride copolymer, high impact styrene and methyl methacrylate copolymer sheet and produced without difficulty sharply corrugated sheet in which the material at the angle was thicker than in the flat area drawn between angles. Because of this thicker "fold" and because of the completely identical thickness distribution at both "hill" and "valley" an exceptionally strong and stable corrugated sheet was obtained, suitable for use as lampshade, decoration, panel infill, etc.

EXAMPLE 7

By using the machine of Example 2 and combining or extending the methods of Examples 3 and 6 we were able to produce various roofing, siding and panelling products using rigid PVC sheet of heavier caliper (around 0.080 inch sheet) via a reheat line. One such product will indicate the approach employed. Our purpose was to produce profiled PVC roofing sheet in continuous lengths, the corrugation taking the form of a repeated sharply angled trapezoidal shape with a valley to valley pitch of 1½ inch. Our combs comprised a series of short lengths of knife edge set parallel to machine direction each forming a short line segment of the continuous product. The knife edges were again made from "steel" rule as defined in Example 7. One array carried the edges to define one set of internal angle folds, the other array carried the knife edges of the opposite sense. The rigid PVC sheet was supplied via the reheat line at rates of 10′ minute. Crisply defined corrugated sheet was produced continuously. This product had better polish and geometric definition than commercial roofing produced by dragging remelt sheet through a lubricated slot. Retention of extra thickness at angles resulted in an increase of crush strength and stiffness. We found that roofing and siding products with secondary corrugations (resembling those shown in FIG. 5, but not on sinnous corrugated sheet) could be produced: such products exhibit a gain in strength but could not have been continuously made by the prior art.

I claim:

1. A continuous process of deforming a sheet of thermoplastic material by sequentially pressing against one face of a molten sheet of the material at a temperature below its decomposition point the cold tips of projections set in and extending normally from a first series of separately moveable combs and sequentially pressing against the second face of the material the cold tips of projections set in and extending normally from a second series of separately moveable combs so that the projections on the first series of combs interpenetrate with the projections on the second series of combs in such a manner that the projections of the first series are spaced from the projections of the second series by a distance greater than the thickness of the sheet; the interpenetrated projections are substantially parallel during the act of interpenetration; and the combs of any one series form a block pressing against the sheet of thermoplastic material, wherein the block so formed by the combs of any one series has two straight parallel side, parallel with the sides of the thermoplastic sheet and has non-linear projections running across the block having a median normal to the parallel sides of the block said projections characterized in that an envelope around any one projection overlaps with the envelope around an adjacent projection; the combs each contain one or more complete projections; and wherein the interpenetrated combs are moved along at the speed of the sheet until the sheet is set and the combs are then removed and recycled and wherein the temperature of the cold tips of the projection is at all times during the interdigitation process less than the softening point of the thermoplastic material.

2. A process according to claim 1 wherein thermoplastic material is selected from the group consisting of PVc homopolymer, copolymers of vinyl chloride and vinyl acetate polyvinylidene chloride copolymers, copolymers of ethylene and vinyl alcohol, low density polyethylene, high density polyethylene, polypropylene, high impact polystyrene and poly-4(-methylpentene-1); polyesters such as poly(eithyleneterephthalate) and poly 1,(1-bis(methylene)cyclohexaneterephthalate(1,2-cis:trans); polyamides such as nylon 66, 610, 6 and 11; inorganic glass such as soda or borosilicate glass; thermoplastic rubbers; superplastic zinc, superplastic aluminium and supercooled liquid sugar solution.

3. A process according to claim 1 wherein the projections are sine shaped curves or zig zags.

4. A process according to claim 3 wherein the projections have side portions extending from the main projections.

5. A continuous process for deforming a sheet of thermoplastic sheet comprising: moving two series of combs along spaced-apart looped endless paths such that along a portion of each path some of the combs of each group are in opposed relationship to define a space and move in the same direction along parallel paths, each of said combs having projections extending therefrom so that in said space the projections on one series of combs are parallel to and can interpenetrate with the projections on the other series of combs, the projections on each comb extending in non-linearly across the respective comb in a direction transverse to the paths of the combs, and being arranged such that an envelope around any one projection overlaps with the envelope around an adjacent projection; feeding a continuous sheet of thermoplastic material heated to a molten condition below its decomposition point into said space in the direction of movement of the combs along said space; moving each comb, as it enters its parallel path, normal to said parallel path and into said space so that the projections on opposed combs interpenetrate with each other and whereby the tips of opposed combs press against opposite sides of the sheet and deform the same; during the interpenetrating operation maintaining the temperature of the tips of the projections at a temperature less than the softening point of the sheet; and moving each comb, as it leaves its parallel path, normal to said parallel path and away from said space so as to withdraw the tips of the projections from the deformations in the sheet.

* * * * *